United States Patent [19]
Weaver et al.

[11] Patent Number: 5,393,004
[45] Date of Patent: Feb. 28, 1995

[54] MULTI-DISC DRAG FOR FISHING REELS

[75] Inventors: Robert E. Weaver; Robert L. Carpenter, both of Tulsa, Okla.

[73] Assignee: Zebco Corporation, Tulsa, Okla.

[21] Appl. No.: 95,058

[22] Filed: Jul. 20, 1993

[51] Int. Cl.⁶ ............................................. A01K 89/01
[52] U.S. Cl. ..................................... 242/268; 242/244
[58] Field of Search ................... 242/244, 268, 267; 464/45, 46

[56] References Cited

U.S. PATENT DOCUMENTS

| | | | |
|---|---|---|---|
| 2,263,836 | 11/1941 | Balz et al. | 242/268 |
| 2,646,939 | 7/1953 | Hirsch. | |
| 3,105,371 | 10/1963 | Forrest | 464/46 |
| 3,239,162 | 3/1966 | Henze. | |
| 3,659,807 | 5/1972 | Fleischer. | |
| 3,675,502 | 7/1972 | Sarah | 242/268 |
| 3,794,264 | 2/1974 | Hull. | |
| 4,482,105 | 11/1984 | Noda. | |
| 4,522,354 | 6/1985 | Sato et al. . | |
| 4,558,828 | 12/1985 | Morimoto. | |
| 5,118,048 | 6/1992 | Childre et al. | 242/267 |

Primary Examiner—Katherine Matecki
Attorney, Agent, or Firm—Wood, Phillips, VanSanten, Clark & Mortimer

[57] ABSTRACT

A multi-disc clutch star drag for a fishing reel in which drag clutch elements frictionally engage the faces of the drive gear, wherein an additional set of clutch washers is incorporated, both riding on an extended body of the drive gear, one of said washers having peripheral fingers which extend axially into sliding engagement with a friction flange attached to the crank handle drive shaft of the reel.

6 Claims, 3 Drawing Sheets

PRIOR ART

MULTI-DISC DRAG FOR FISHING REELS

TECHNICAL FIELD

This invention is in the field of drag braking systems for fishing reels and has particular application to the spin-cast fishing reels of the type invented by the late R. D. Hull and disclosed in his U.S. Pat. No. 3,794,264, wherein the braking action is against the drive gear of the reel and the drag mechanism is supported by the hand crank drive shaft of the reel.

BACKGROUND OF THE INVENTION

Drag systems are incorporated in fishing reels to provide an adjustable clutch type connection between the line take-up and dispensing spool or spindle of the reel and the drive mechanism which rotates the spool or spindle. Such drag systems permit the fisherman to regulate the amount of force which he may exert upon the line, and consequently upon the catch at the other end, for the purpose of maintaining the desired tension on the line and thereby enhancing the probability of landing the catch.

One type of drag mechanism, the type to which the invention relates, is illustrated in FIG. 4 of U.S. Pat. No. 3,794,264. In this prior art reel, frictional braking force was applied to the front and rear faces of the drive gear through a mechanism which is supported by the drive shaft of the reel connected to the crank handle.

With reference to FIG. 4 of the aforesaid patent, reproduced herein as FIG. 3 under the label "Prior Art", rotation of the star drag handle 99, squeezes the drive gear 80 between flanges 81a and 92 which rotates with the reel crank handle drive shaft 81, thereby tending to lock the gear 80 to the crank shaft 81.

The problem with the prior art mechanisms typical of that disclosed in FIG. 3 is that they have proved to be inadequate to deal with the forces involved in the operation of the reel and the heat generated by braking action. Specifically, the braking force capable of being applied to the line retrieval mechanism was either incapable of holding the line, was uneven resulting in an unpleasant motion of the reel, or the drag system would heat up resulting in the loss of braking force and even a burn-out of the drag system.

Attempts were made to improve braking effectiveness of these prior art systems by increasing the diameter of the clutch elements that make up the brake, but the clutch washers required to effectively accomplish this end were too large to fit in the space available.

The invention here disclosed eliminates the above-mentioned problems by greatly increasing the effective braking area of the described prior art drag systems and, importantly, accomplishes this end with a minimum of additional hardware and in a minimum of space. As a consequence, braking action is smoother, particularly when high braking forces are required and the heat generated is more quickly dissipated avoiding overheating of the clutch assembly of the drag system.

SUMMARY OF THE INVENTION

The invention is of a drag system for a fishing reel comprised of a multi-disc clutch assembly having a plurality of annular clutch washers operating in conjunction with braking surfaces on the drive gear of the reel and flanges attached to the crank handle drive shaft of the reel. Fingers extend longitudinally from one clutch washer and slidingly extend through open channels in one of the flanges whereby the two are connected and thus caused to rotate together and yet permitted to move longitudinally with respect to one another. A clutch washer mounted upon and for rotation with the drive gear is interposed between the connected flange and washer. Rotation of a star drag handle upon a threaded portion of the drive shaft compresses the elements of the clutch and engages the drag system.

One objective of the invention is to effectively double the area of the clutch elements which are in frictional contact with each other, and thus double the braking capability of the drag.

A second objective of the invention is to accomplish the aforesaid increase in braking capability without adding any structure to the body of the reel and only minimal structure to the clutch assembly.

Yet another objective of the invention is to increase heat dissipating ability of the brake assembly, which results from spreading the forces involved over a larger area of frictional contact between the clutch elements of the brake.

A further objective achieved by increasing the area of the clutch elements is that the forces imposed on the drag system are more evenly distributed throughout the clutch assembly, the overall effect of which is to provide smoother operation of the drag and a greater range of drag settings available to the operator.

DETAILED DESCRIPTION OF THE PREFERRED EMBODIMENT

Figure 1:
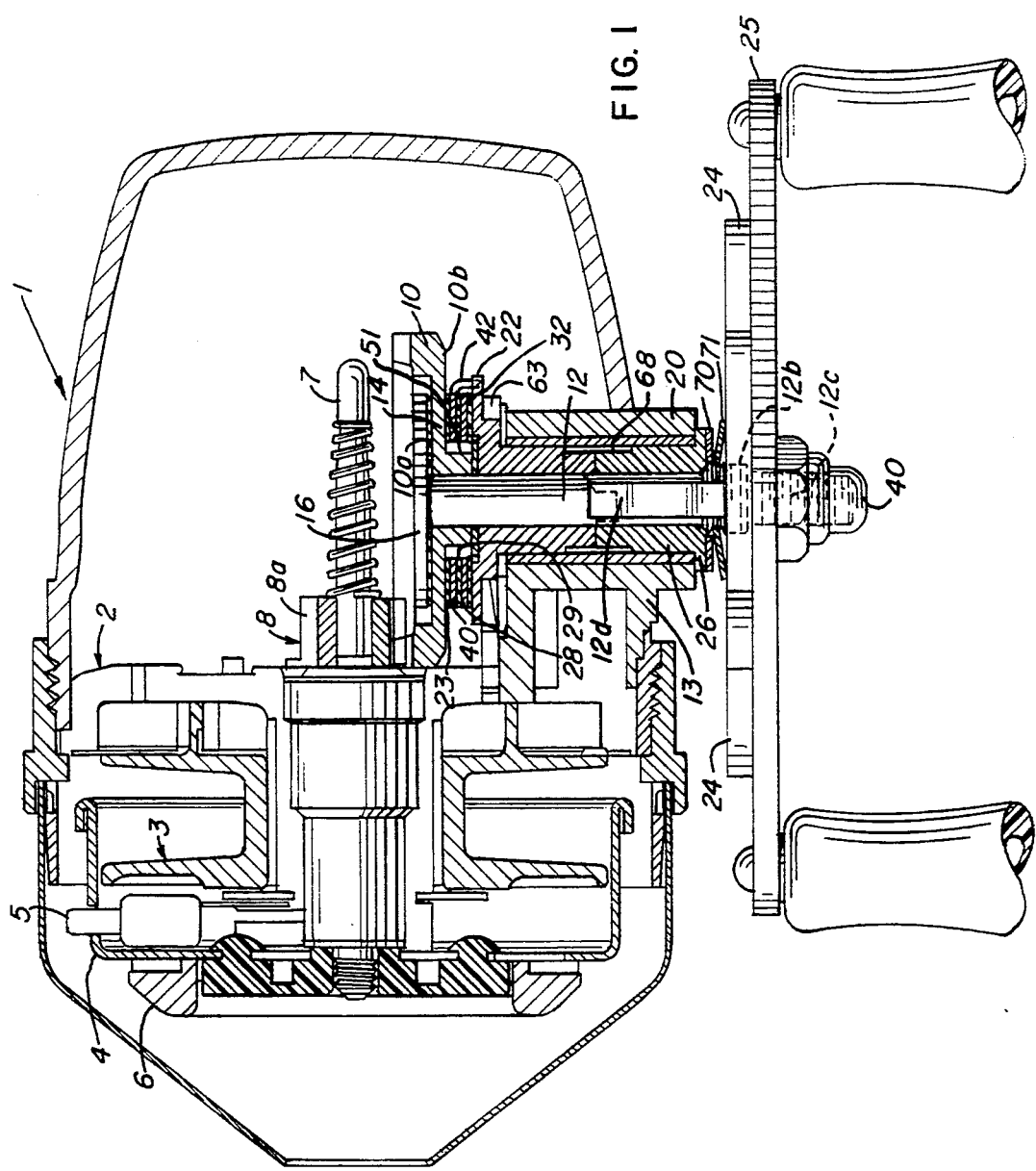
FIG. 1 is a longitudinal cross-sectional view taken horizontally through a spin-cast type reel embodying the multi-disc clutch drag system of the invention.

FIG. 1 illustrates a spin-cast fishing reel 1 having a body 2, a line carrying spool 3, a line pick-up spindle 4 with pick-up pin 5 and a line brake 6. The spindle 4 is attached to a spindle shaft 7 which is attached to and rotatingly driven by a spur gear 8. The spur gear 8 is engaged and driven by a face gear 10 which is mounted for rotation upon a crank drive shaft 12 connected to the reel handle 25.

The crank shaft 12 is comprised of a ranged head 14, a solid generally cylindrical body 12a with two threaded portions 12b and 12c at the outer end thereof. Threaded portion 12c accepts a nut 40 which threads thereon to hold the handle 25 on the shaft 12. A star drag adjustment handle 24 threads onto threaded portion 12b of the crank shaft 12 inside of the handle 25 from which position it may be rotated clockwise to move it against the spring washer 71 and the cam 26 to engage the clutch drag as described below.

Figure 2:
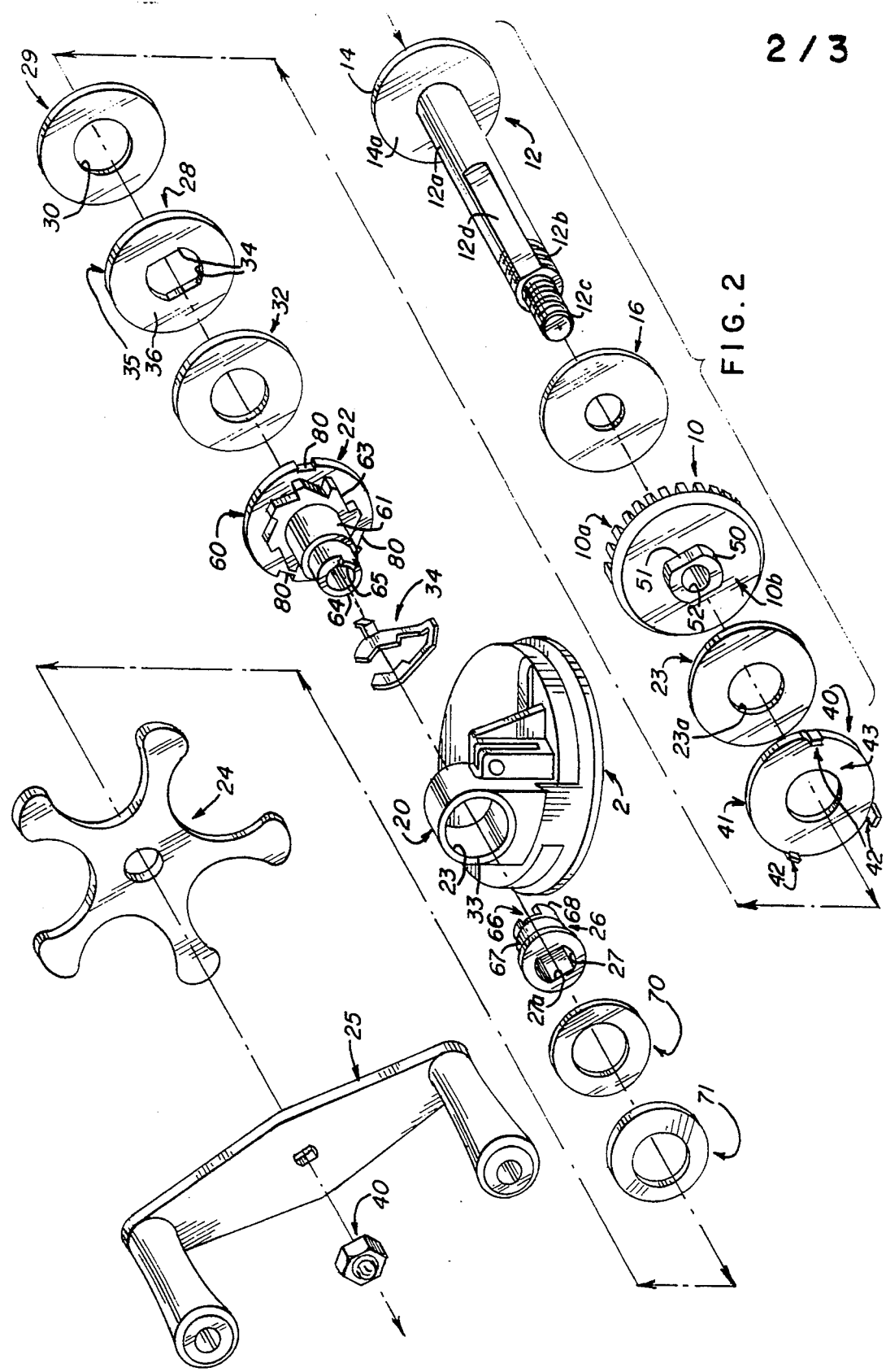
FIG. 2 is an exploded view in perspective illustrating the elements of a clutch drag system of the invention and the order of its assembly to the body of the fishing reel of FIG. 1.
Figure 3:
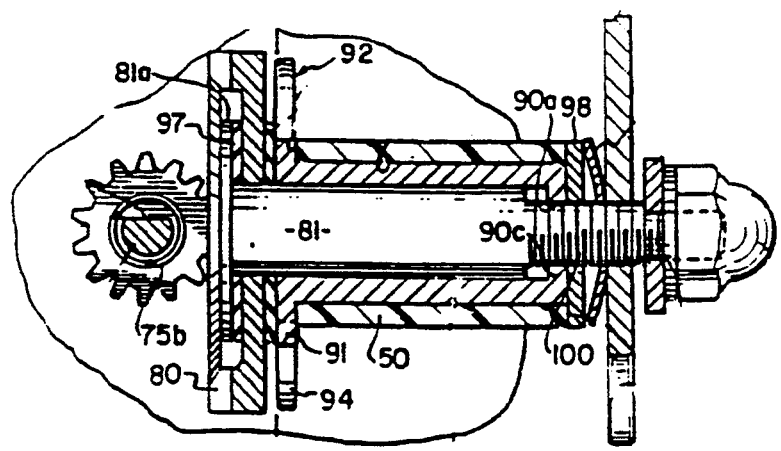
FIG. 3 is a reproduction of FIG. 4 of U.S. Pat. No. 3,794,264 representative of the prior art.

Referring to FIGS. 1 and 2, the drive gear 10 is a face gear having teeth 11 which extend axially to engage the teeth 8a of the spur gear 8 and a generally cylindrical body 50 extending axially therefrom in the direction of the handle 25. Flats 51 on the body 50 provide a squared cross-section to retain the clutch washer 28 which rides thereupon and rotates therewith as explained below. A bore 52 through the gear 10 is sized to accept the shaft 12 with tolerance to permit gear 10 to rotate smoothly upon the crank shaft when not held by the drag mechanism.

The drag clutch assembly includes a flange 22 which has a cylindrical body 61 extending axially therefrom and may incorporate an anti-reverse ratchet gear 63 behind the clutch face 60 thereof. A bore 62 extends axially through the center of the flange 22 and is also sized to accept the cylindrical body portion of the crank shaft 12. Of particular importance to the invention is the presence in the outer periphery of the flange 22 of channels 80 extending axially therethrough and which align with the fingers 42 on the brake washer 40, so that when the drag mechanism is assembled, the fingers 42 ride axially within the channels 80 and thus cause the flange 22 and washer 40 to rotate in unison. This configuration permits axial movement between the washer 40 and the flange 22 of the type that occurs when the clutch mechanism is engaged and disengaged.

Referring to FIG. 2, the supporting body 2 of the reel includes a cylindrical section 20 projecting aft thereof having a bore 23 extending therethrough with its longitudinal axis perpendicular to the fore and aft axis of the reel body 2 and the spindle shaft 7, so that the gears 8 and 10 will be properly aligned when engaged upon assembly of the reel.

When assembled, the cylindrical section 20 supports the entire crank shaft and drag clutch assembly. The body 61 of the flange 22 fits within the bore 23 extending through the cylindrical section 20 and is supported therein by a sleeve 33 made of sintered bronze, which facilitates axial movement of the flange 22 when the drag mechanism is adjusted.

The invention is most easily understood by describing the order of assembly of the drag clutch elements upon the crank shaft 12 and to the cylindrical section 20 of the reel body 2. First onto the shaft 12 is a friction washer 16 made of polypropylene which function to smooth the frictional engagement between the face 14a of the flange 14 and the face 10a of the gear 10. Next onto the shaft is the face gear 10. A second friction washer 23 with an annular axial bore 23a therethrough sized to accept the extended body 51 of the gear 10 is placed upon the body 51 and is free to rotate thereupon.

Next onto the assembly is a brake washer 40 which is a key element of this invention. The washer 40 which has an annular axial bore therethrough sized to accept the extended body 51 of the gear 10 and rotate thereupon. The washer 40 has three fingers 42 extending axially from the outer periphery thereof, which fingers engage the channels 80 in the flange 22 as described below. Following brake washer 40 is a friction washer 29 having an axial bore 30 therethrough sized to accept the extended body 51 of the gear 10 by which it is supported.

Following the friction washer 29 is a second brake washer 28. The washer 28 has an axial aperture 34therethrough which is squared to match the flatted portions 51 of the extended body 50 of the drive gear 10 so that when positioned thereupon, it will rotate with the gear 10. The opposite clutch faces 35 and 36 of washer 28 interact with the opposing faces 43 and 60 of brake washer 40 and the flange 22, respectively. Following the brake washer 28 is a friction washer 32 which is configured to freely rotate upon the body 51 of the gear 10 in the manner of the other washers 23, 40 and 29.

Next onto the shaft 12 is flange 22, which is also a key element of the invention. The flange 22 has an elongated cylindrical body 61 extending axially thereof terminating in an annular end portion 64 having a generally squared projection 65 therein configured to mate with a matching detent 66 in the end of cam 26 described below. The flange 22 also has a ratchet wheel 63 preferably integral therewith which functions to prevent rotation of the flange 22, the engaged drag mechanism and the line spindle 4 from rotating in the reverse or line unwinding direction when the pawl 34 engaged thereupon.

Last onto the drive shaft before the assembly is placed into the body 20 of the reel is an anti-reverse pawl 34. The structure of the anti-reverse mechanism is known to the art and so will not be described here.

The above-described assembly including the crank shaft 12 and the elements thereon is inserted into the bore 23 of the reel body 20. Thereafter, a cam piece 26 is placed onto the shaft 12. Cam 26 has an axial bore 27 therethrough which has axial flats 27a thereon configured to match the flats 12d on threaded section 12b of the crank shaft 12, so that when in the assembled position depicted in FIG. 1, the cam 26 is effectively keyed to the crank shaft 12. The interior end 68 of the cam 26 has a squared detent 66 therein sized to receive the projection 65 extending toward the cam 26 from the end 64 of flange 22. The configuration being such that when assembled, the flange 22 is prevented from rotating with respect to the cam 26 and therefor the crank shaft 12. A flange 26a extends radially outwardly from the cylindrical body 67 of cam 26 and functions to protect the exterior end of bore 23, and the drive and drag assembly from the entry of sand or other contaminants.

Following the cam 26 are a slip washer 70 and a spring washer 71 both with annular axial bores therethrough configured to fit over the threaded portion 12b of the crank shaft 12. The drag assembly is completed by threading the star handle 24 onto the threaded portion 12b of the crank shaft 12. Once assembled, "drag" or a braking force on the drive gear 10 is created by squeezing the drive gear 10, flanges 14 and 22 and brake washers 40 and 28 together. This is accomplished by turning the star handle 24 clockwise screwing it onto the shaft threads 12b and thereby causing the flanges 14 and 22 to move closer together and squeezing the clutch elements between the flanges 14 and 22. Braking action takes place between the friction faces 14a and 60 of the flanges 14 and 22, respectively, and 41 and 43 of brake washer 40 which are effectively keyed to the crank shaft 12, and the respective opposing friction faces 10a and 10b of the drive gear 10 and 35 and 36 of the brake washer 28 which is effectively keyed to the drive gear 10.

All of the drag clutch elements described above are preferably made of stainless steel except the friction washers which are preferably made of polypropylene.

Key to the invention is the interaction between the brake washer 40 and the flange 22. As illustrated in FIGS. 1 and 2, fingers 42 integral with washer 40 extend axially thereof, outside the peripheral edge of interposed brake washer 28 and into engagement with channels 80 extending through the outer periphery of the flange 22, so that as the drag assembly is tightened or loosened, the axial distance between the washer 40 and the flange 22 may change without loss of the keying effect of the fingers 42 being engaged in the channels 80 in the flange 22.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A drag mechanism for a spin-cast fishing reel having a reel body, a line spool, a line pick-up spindle and means for rotating the spindle comprised of a crank handle, a drive shaft and a drive gear, said drive gear having an axially extended body and said drag mechanism comprising a multi-disc clutch for drivingly connecting said drive gear to said drive shaft, said clutch comprising:

a clutch flange mounted upon and for rotation with said drive shaft, a first annular clutch washer mounted for free rotation upon the extended body of said drive gear, means for connecting said first annular clutch washer to said clutch flange whereby said clutch flange and said first annular clutch washer are caused to rotate together, a second clutch washer mounted upon the extended body of said drive gear between said clutch flange and said first annular clutch washer and means for causing said second clutch washer and said drive gear to rotate together.

2. The invention of claim 1 wherein said means for connecting said first annular clutch washer to said clutch flange comprises a plurality of rigid members attached to one of said clutch flange and first annular clutch washer and extending axially therebetween into engagement with the other of said first annular clutch washer and said clutch flange, said rigid members being positioned outside the radial periphery of said second clutch washer and apart from the reel body.

3. The invention of claim 2 wherein said rigid members comprise fingers integral with said first annular clutch washer, and wherein said clutch flange has apertures therein configured to receive said fingers.

4. In a spin-east type fishing reel having:
a reel body;
a line spool;
a line pick-up spindle and means for rotating said spindle including a spindle shaft and attached driven spur gear, a crank handle drive shaft, and a drive gear having an axially extending body and rotatingly mounted on said drive shaft and in engagement with said spur gear;
an improved drag means for causing said drive gear to rotate with said drive shaft, comprising:
a clutch flange mounted upon and for rotation with said drive shaft, a first annular clutch washer mounted for free rotation upon the extended body of said drive gear, means for connecting said first annular clutch washer to said clutch flange whereby said clutch flange and said first annular clutch washer are caused to rotate together, a second clutch washer mounted upon the extended body of said drive gear and between said clutch flange and said first annular clutch washer and means for causing said second clutch washer and said drive gear to rotate together.

5. The invention of claim 4 wherein said means for connecting said first annular clutch washer to said clutch flange comprises a plurality of rigid members attached to one of said clutch flange and first annular clutch washer and extending axially therebetween into engagement with the other of said first annular clutch washer and said clutch flange, said rigid members being positioned outside the radial periphery of said second clutch washer and apart from the reel body.

6. The invention of claim 5 wherein said rigid members comprise fingers integral with said first annular clutch washer, and wherein said clutch flange has apertures therein configured to receive said fingers.

* * * * *